(No Model.) 3 Sheets—Sheet 2.
A. BOWSER.
SELF MEASURING OIL WAGON.
No. 561,650. Patented June 9, 1896.
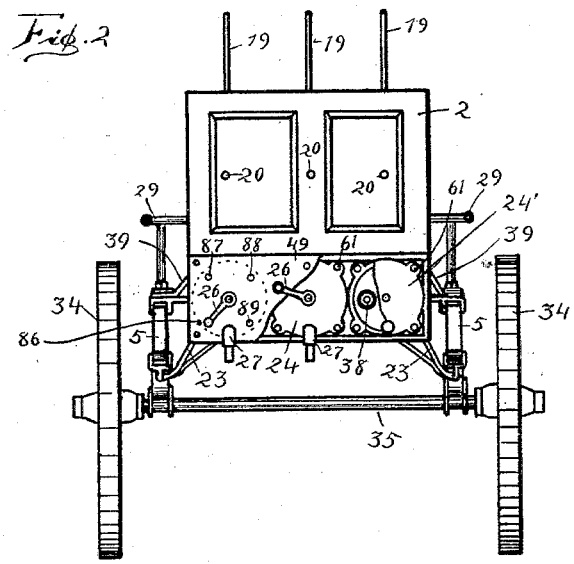
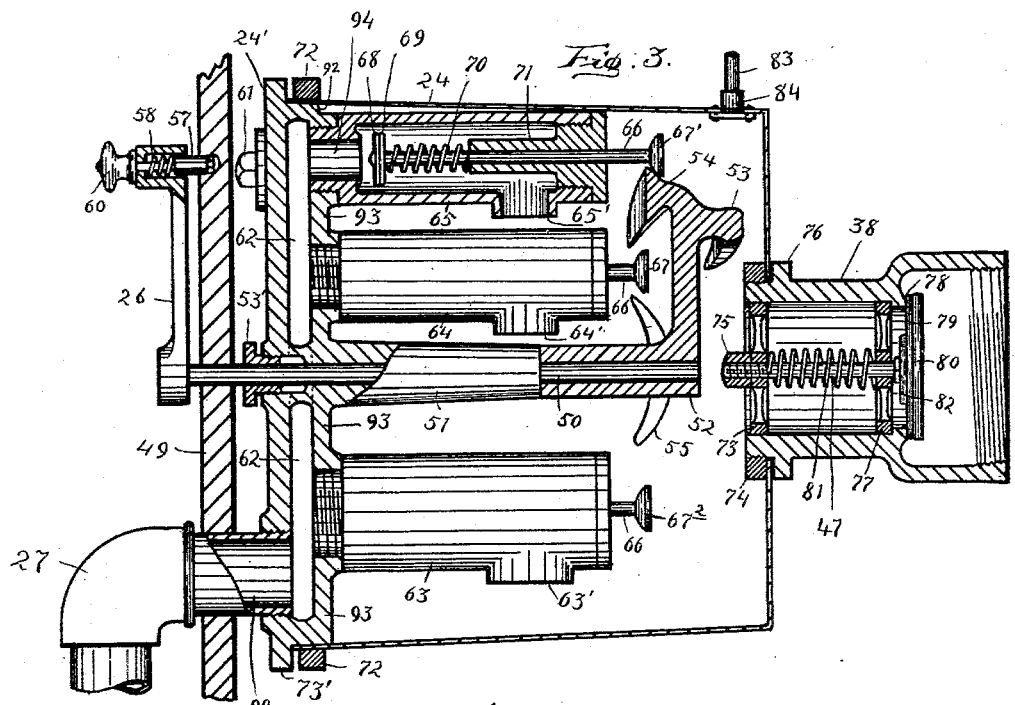
WITNESSES: Augustus Bowser INVENTOR
Walter G. Burns
Kate B. Chapin
BY Chapin & Denny
his ATTORNEYS.

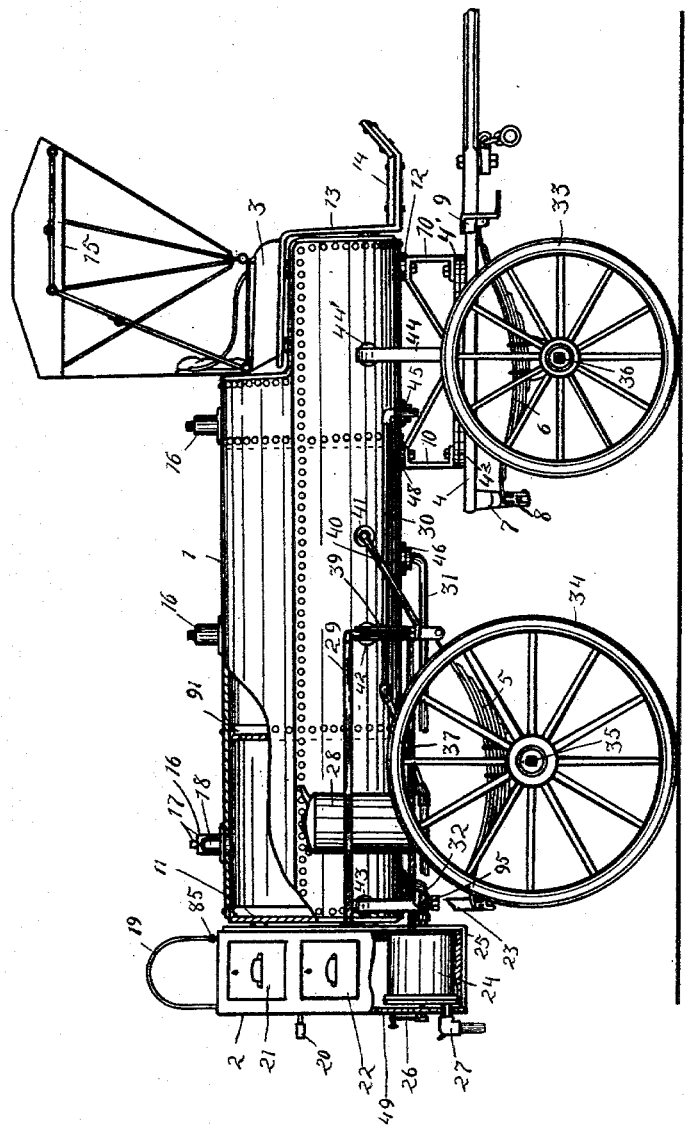

(No Model.) 3 Sheets—Sheet 3.
A. BOWSER.
SELF MEASURING OIL WAGON.
No. 561,650. Patented June 9, 1896.
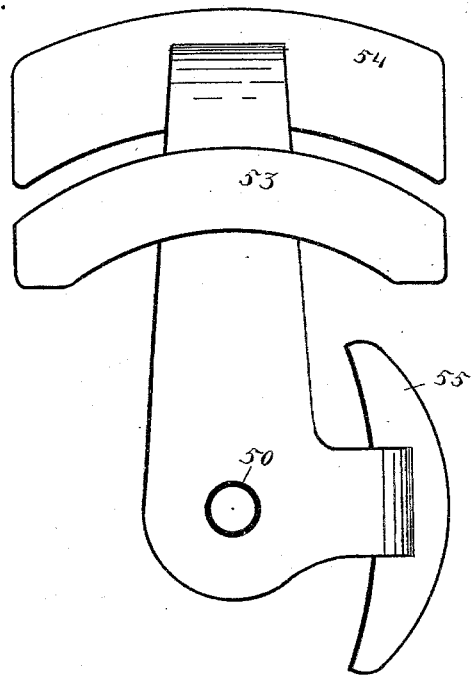
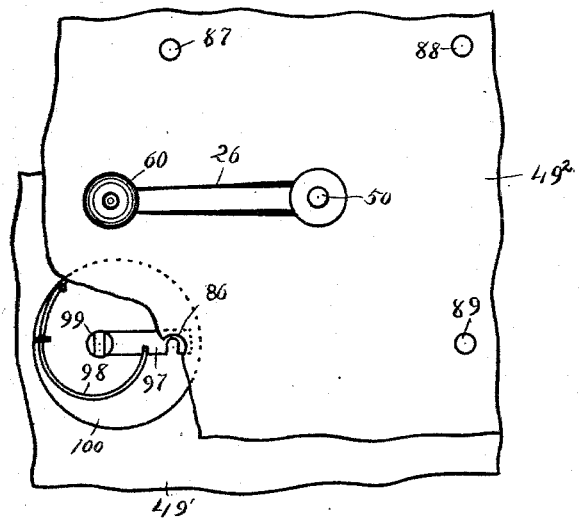
WITNESSES:
Walter G. Burns
Kate B. Chapin.
Augustus Bowser INVENTOR
BY Chapin & Denny
his ATTORNEYS.

UNITED STATES PATENT OFFICE.

AUGUSTUS BOWSER, OF FORT WAYNE, INDIANA.

SELF-MEASURING OIL-WAGON.

SPECIFICATION forming part of Letters Patent No. 561,650, dated June 9, 1896.

Application filed September 7, 1895. Serial No. 561,755. (No model.)

*To all whom it may concern:*

Be it known that I, AUGUSTUS BOWSER, a citizen of the United States, residing at Fort Wayne, in the county of Allen, in the State of Indiana, have invented certain new and useful Improvements in Self-Measuring Oil-Wagons; and I do hereby declare that the following is a full, clear, and exact description of the invention, which will enable others skilled in the art to which it appertains to make and use the same, reference being had to the accompanying drawings, which form part of this specification.

My invention relates to improvements in automatic self-measuring oil-wagons.

My invention comprises a supply-tank or reservoir rigidly mounted upon carrying-wheels without the aid of a supporting-frame, the said reservoir being preferably cylindrical, divided into separate compartments by diametrical partitions, and having arranged at its rear end an upright cabinet, provided with a series of self-measuring receptacles having a series of spaced outlet measuring-valves, each of said receptacles being provided with a valved connection with its respective reservoir-compartment and also with the atmosphere by proper air-pipes.

The object of my invention is to provide an automatic self-measuring oil-wagon for measuring and delivering liquids at retail, specially designed and adapted for measuring and delivering kerosene and other oils by a series of valved self-measuring receptacles, so arranged as to secure infallible accuracy in measurement, convenience and cleanliness in handling, prompt and reliable in action, insuring a great saving of time and labor, and so constructed as to afford small liability of getting out of repair.

The novel features of my invention are the manner of mounting the reservoir upon the carrying-wheels and the means for automatically measuring and delivering the liquid from the said cabinet.

Similar figures of reference indicate corresponding parts throughout the several views.

Figure 1 is a side elevation of my invention, partly cut away to show the interior of the oil tank or reservoir, and also of the self-measuring receptacles with the valve mechanism removed. Fig. 2 is a rear end elevation of the same, partly cut away to show the relative arrangement of the said self-measuring receptacles in their containing-cabinet. Fig. 3 is a longitudinal section of one of the said receptacles, showing its self-measuring mechanism and its inlet and discharge ports. Fig. 4 is a detail of the cam-lever, showing an end view thereof. Fig. 5 is a detail of the hasp-lock for securing the operating-crank. Fig. 6 is a longitudinal section of the whistle. Fig. 7 is an exterior end view of the same.

The liquid-reservoir or carrying-tank 1, preferably of boiler-iron, oblong and cylindrical in form, is closed at both ends by proper heads and is divided into separate liquid-holding compartments, preferably three in number, by proper metallic diametric partitions, as seen at 91, Fig. 1. Each of the said compartments is provided with an air-chamber 16, arranged, as shown, upon the top of said tank, communicating at its top with the atmosphere and containing a float-valve 18, adapted to be normally open for the admission of air into its corresponding compartment, but is automatically closed by the upward pressure of the liquid when the said compartment is full. The forward end of the said tank has a transverse recess in which is a suitable driver's seat 3, having a proper top 15 and depending bracket 13, with a foot-board 14 fixed therein.

The forward carrying-wheels 33, of any proper size and construction, are connected by any proper steel axle 36, near the respective extremities of which are rigidly fixed in a transverse position the forward supporting-spring 6, upon the rear end of which is mounted a cross-spring 7. Upon the said cross-spring and the forward end of the said springs 6 is rigidly fixed the hounds or forward gear 4, provided with a proper fifth-wheel, upon the upper and rotatable portion of which is rigidly fixed the longitudinally-arranged supporting-bracket 10, firmly but detachably secured at its extremities to the fixed plates 12 and 48, respectively, or the lower face of the said tank and near the forward end thereof, Fig. 1. The forward end of the tank 1 is further secured by the vertical braces 44, one upon each side thereof, the upper end of which is bolted in a proper manner to a fixed plate 44'. To the hounds 4 is connected a proper tongue 9.

The rear wheels 34 are connected by a steel axle 35, provided near its extremities with the supporting-springs 5, transversely fixed thereon in any proper manner, provided at their forward end with the oblique supporting-brackets 39, the upper ends of which are secured to the fixed plates 42 or the sides of said tank, and the rear ends of said springs are provided with the oblique supporting brackets or braces 23, secured at their upper end to the plates 43 on the sides of said tank. At a suitable point on the said brackets 39 is rigidly bolted the rear end of the oblique brace 40, one upon each side of said tank, the upper end of said brace being rigidly fixed upon the plate 41 or the side of said tank. The said oblique braces 40 are thus adapted to sustain the draft of the rear truck. My improved oil-tank thus described is securely mounted and compactly connected with its carrying-trucks without the aid of a reach or supporting-frame, as heretofore employed. The said tank is also provided at its rear end with a proper supporting-rack 29, arranged at the sides thereof and adapted to carry the delivery-cans 28, of any desired size, preferably of five-gallon capacity. To the rear end of said reservoir or carrying-tank 1 is securely but detachably mounted an upright rectangular cabinet 2, having its upper portion provided with a series of drawers 21 and 22, which may be used for soap in retail packages or other commodities commonly carried by oil-wagons. In the lower portion of said cabinet is transversely arranged a series of cylindrical self-measuring receptacles 24, Fig. 2, whose sides are slightly contracted toward the rear end thereof, Fig. 3, and are integral with the metallic bottom. At or near the outer edge of the said sides is mounted a clamping metallic ring or collar 72, to which the detachable front face 24' is rigidly secured by means of the threaded bolts 61, arranged in suitable ears on the perimeter of said face. The said front face 24' is provided near its perimeter with an annular inwardly projecting flange 92, adapted to snugly fit within and tightly close the front end of the said receptacle. The said detachable face 24' is provided upon its inner surface with an integral vertical and diametrical portion 93 (shown in longitudinal central section in Fig. 3) and having a width slightly greater than the outside diameter of the valve-cylinder 63. The said portion 93 has a longitudinal opening or chamber 62, extending throughout its length. The integral boxing 51 passes through the said opening 62 midway its ends and sides without materially interfering with the communication between its extremities. The said portion 93 is provided with lateral screw-threaded openings, in which the externally screw-threaded end of the cylindrical valve-bodies 63, 64, and 65 are respectively mounted. The said cylinders are provided, respectively, with inlet-ports 63', 64', and 65', whereby a free communication is established between the interior of the measuring-receptacles 24 and the said chamber 62 through the forward end of each of the said cylinders, the rear end of which is closed in each instance by the inwardly-elongated cap 71 by a screw-threaded connection therewith, as shown in Fig. 3. In a longitudinal central opening in said cap is loosely mounted a valve-stem 66, provided upon its inner end with a valve consisting of a metal disk 69, having a leather washer 68. The inner end of the said valve-stem 66 is surmounted by a spiral spring 70, having one end thereof bearing against the said disk and the other end bearing against the extended end of the said cap 71. The opening 94 at the inner end of the said cylinders is of a somewhat less diameter than the central chamber, thereby forming a seat for the said valve. The rear end of the said valve-stems are provided with a rigid disk 67, 67', and 67², respectively, having a convex rear face adapted for engagement with the operating-cams presently to be described.

In the longitudinally-perforated boxing 51 is loosely mounted the shaft 50, carrying on its extended inner end the L-shaped lever 52, rigidly secured thereon in any proper manner and provided with a series of integral operating-cams 53, 54, and 55, Figs. 3 and 4. The said face 24' is provided with an apertured nut 53', mounted therein by a screw-threaded connection, and serves as a bushing for the said shaft 50.

The cams 53 and 54 are very similar in form, being slightly curved and having plano-convex sides.

The cam 54 is outwardly extending upon the free end of the lever 52 and is adapted to open the upper valve by engagement with the said disk 67', the upper edge and convex face of cam 54 impinging upon the inner and convex face of the said disk as the lever 52 is rotated by the crank-arm 26, and thereby gradually withdrawing the respective valve-stem against the tension of the retracting-spring 70. When the said cam 54 has been rotated past its engagement with the said disk 67', the valve 69 will automatically resume its seat under the pressure of spring 70. The valve in the valve-body 63 is similarly operated by a like engagement of the lower edge of the cam 54 with the convex face of the valve-disk 67².

The cam 53 upon the opposite side of the lever 52 is so arranged thereon that when the said lever is properly rotated the outer convex face thereof will engage the outer and convex end of the valve-guide 75, hereinafter described, and force the same outward, thereby opening the valve 80.

The crescent-shaped cam 55 has a vertical arrangement relative to the cams 53 and 54 and is adapted for engagement with the disk 67 in the valve-body 64, the concave side thereof impinging against the concave side of said disk as the lever 52 is rotated and thereby withdrawing its respective valve and valve-stem, which upon being released will automatically resume its normal position under the tension of its retracting-spring, as above described.

The outer end of the shaft 50 is provided with a rigidly-mounted crank-arm 26, having upon its free end a knob or handle 60. The free end of said crank 26 is provided with a hollow head in which is loosely mounted a spring-pressed stop 57, carrying upon its inner end the spiral spring 58, and adapted to normally press the said stop into engagement with the perforations 86, 87, 88, or 89, respectively. The outer end of the said stop 57 is fixed in the handle 60 and can thereby be readily disengaged from one of the said perforations or may be held out of engagement and passed over the same as desired. In a suitable screw-threaded opening in the face 24', and near the lower edge thereof and communicating with the said chamber 62, is detachably mounted by a screw-threaded connection a proper discharge-pipe 27, by which the oil or other liquid is delivered. At a suitable point in the side of each of the said receptacles 24, preferably near the inner end thereof, is fixed a collar 84, Fig. 3, having upon its inner end a retaining annular flange adapted to rest against the inner face of said side, and having its outer end internally screw-threaded to receive and secure the lower end of the air-pipe 83, which passes upward through the cabinet 2 and is connected to the air-pipe 19 by the screw-threaded coupling 85, Fig. 1. The said pipe 19 is carried upward a distance of about twelve inches and then curved downward, passed into the top of said cabinet and then outward through the front face of the cabinet, and has its outward end surmounted by an air-whistle 20, Figs. 6 and 7, comprising a shell or casing, in the rear end of which is soldered a screw-threaded plug 103, in which the end of the said air-pipe 19 is secured. A pair of diametric brackets 101 and 102, in which a longitudinal shaft 105, carrying a fixed fan 104, is revolubly mounted, and is adapted to notify the operator when the measuring-receptacle is filling with liquid by an audible whistle caused by the outflowing air through the shell from said pipes 83 and 19.

The cylindrical valve-body 38, Fig. 3, centrally chambered, as shown, has its inner end externally screw-threaded with an annular integral flange 76 thereon and is adapted to snugly fit a central aperture in the rear end of said receptacle 24, with the said flange 76 abutting thereon, and is secured therein by the screw-threaded metallic collar 74, thereby making said aperture air-tight. The rear end of the valve-body 38 is slightly enlarged, is internally screw-threaded, and is provided with a valve-seat 78. In the chambered portion of the inner end of the said valve-body and at the extremities thereof are detachably fixed the metallic spiders 73 and 77, in which the valve-stem 47 is loosely mounted, the said valve-stem provided upon its outer end with a valve 80, having a washer 79, secured in position by a disk 82 and a proper holding-nut, and is adapted to normally rest upon the said seat 78. The other end of the said valve-stem 47 is provided with a screw-threaded guide 75, loosely arranged in the said spider 73. Against the outer and convex end of the said guide the operating-cam 53 impinges, as described, thereby forcing the valve 80 from its seat.

To the enlarged and internally-screw-threaded end of the valve-body 38 the outer end of the coresponding feed-pipe 30, 31, or 32 leading from the forward, central, and rear compartments, respectively, of the tank 1 is secured by a screw-threaded connection, the forward end of the said pipes being secured in fixed plates on said tank, as seen at 45 and 46.

The lid 49 is preferably formed of two parts, a wooden body 49', covered by a sheet-metal strip $49^2$. In the outer face of the said lid and at measured distances apart upon the circumference of a circle described about the outer end of the shaft 14 as a center are arranged the circular perforations 86, 87, 88, and 89, adapted to receive the spring-pressed stop 57 of the crank 26. In the body portion 49' of said lid is provided a series of circular recesses 100, adapted to receive a pivoted locking-hasp 97 and a retracting-spring 98. The said hasp has a key-stem 99 rigid upon the pivoted end thereof and has a circular slot 96 upon the lower edge of its free end, adapted to normally form a holding engagement with the said stop 57 when it enters one of the said circular perforations. The said spring 98 has one end secured in said recess, is then curved upwardly, and has its other end secured to the said hasp, whereby the hasp is disengaged from the stop 57 by applying a key to the stem 99 and elevating the said hasp against the tension of the said spring. This secures the operating-crank 26 when thus locked against interference by intruders. The measuring-receptacle 24 can also be used in a stationary retail cabinet.

The operation of my improvement thus described will readily be understood, and, briefly stated, is as follows: The several compartments of the tank or reservoir 1 are filled in the usual manner from barrels or other source of supply with the three desired kinds of oil, preferably gasolene and two grades of kerosene, the communication with the atmosphere of the interior of said compartments being cut off by the said float-valve when the said compartments are filled. The said compartments are preferably filled from below through a T-inlet 95, containing a check-valve and having a removable screw-threaded cap. The operator can now readily draw either kind of oil desired in accurately-measured quantities from the proper receptacles 24, as follows: The operative crank 26 is always so replaced when not in operation that its free end will be in a locked engagement in the perforation 86, as before described, and when the said crank is in that position the cam 53 will be in engagement with the inner end of the valve-stem 47 and its fixed guide 75, thereby keeping the valve 80 open, and thus insuring a filled receptacle when needed for use. When it is desired to measure one quart, the operator unlocks the said crank and moves it upward to its engagement with the perforation 87, which will cause the engagement of the cam 54 with the disk 67', as shown in Fig. 3, thereby permitting the desired measured quantity to flow out through the outlet-port 65' 94, the chamber 62, and the port 90 into the discharge-pipe 27. When it is desired to measure four quarts, the said crank is rotated to the right until it engages the said perforation 88, at which time the said cam 55 will be in engagement with the said disk 67, thereby opening its valve and permitting the oil to pass freely out at the port 64'. When it is desired to measure ten quarts, the crank is rotated until it engages the perforation 89, when the other edge of the said cam 54 will be engaged with the disk $67^2$, thereby opening its corresponding valve and permitting the contents to pass out through the outlet-port 63', after which the crank 26 is replaced in its engagement with the said perforation 86, thereby permitting the corresponding receptacles 24 to refill. It is obvious, therefore, that my improvement is simple, reliable, and prompt in operation, convenient in use, absolutely reliable in measurement, avoids great waste, and is conducive to cleanliness, and is a decided advance upon the present state of the art.

What I desire to secure by Letters Patent is—

1. In a self-measuring oil-wagon, the combination of the cylindrical tank or reservoir 1, transversely chambered and provided with air-chambers 16 having the float-valves 18 as shown, and an upright cabinet 2, having in the base thereof a series of self-measuring receptacles 21, provided upon the front face with a series of spaced, measuring-valves, operated as described by a hand-lever, having upon its inner end the cams 54 and 55 adapted to open said valves by engagement therewith, and also having upon its inner end a cam 53 adapted to open the feed-pipe valve as described, and provided upon its other end with a crank 26, having in its free end a spring-pressed lock to engage measured perforations in the lid 49, all substantially as described.

2. In a self-measuring oil-wagon, an automatic self-measuring apparatus for liquids, consisting of a cabinet having in the base thereof a series of measuring receptacles 24, provided upon their outer face with a series of spaced outlet measuring-valves, arranged therein as described, and communicating with a common discharge-chamber 62, and provided with an operating-lever, having upon its outer end a crank-handle 26, provided with a spring-pressed bolt 57 for the purpose specified, and having upon its inner end integral cams 54 and 55, adapted to open the said measuring-valves as described, and also the fixed cams 53 adapted to open the inlet-valve for the feed-pipe by engagement therewith; the said receptacle also being provided at its inner end with a valve-body 38, removably mounted therein, having a spring-pressed inlet-valve 80, and adapted to admit to said receptacle the liquid from the feed-pipe, all substantially as described.

3. In a self-measuring oil-wagon, a measuring-receptacle 24, having upon its rear end a valved opening from the discharge-pipe, provided with the spring-pressed valve 80, mounted as shown and having an inwardly-extended stem, adapted for engagement with an operating-cam, the said receptacle having upon its forward end a detachable face, provided with a series of spaced valve-chambers, communicating at one end with the said receptacle and the other end with the discharge-pipe as shown, and provided with spring-pressed valves, having terminal disks on the inner end thereof, adapted for engagement with the operating-cams, the said receptacle also being provided with an operating-lever having upon its outer end a crank-handle 26, provided with a hollow head containing a spring-pressed bolt 57 adapted to lock the said crank, as described; the said lever having upon its inner end the cams 54 and 55, adapted for an operative engagement with said valves, and a cam 53 adapted to open the inlet-valve for the feed-pipe, the said receptacle also being connected with the atmosphere by the pipes 83 and 19 arranged as shown, all substantially as described.

4. A self-measuring receptacle 24, having at its rear end a valved connection with the feed-pipe by means of the valve-chamber 38 provided with spring-pressed valve 80 adapted to be operated by an actuating-cam, as shown, and having at its opposite end a removable face 24' centrally chambered and provided with a series of spaced measuring valve-chambers, opening at their forward end into a common discharge-opening 62, and having their rear end closed by the screw-threaded plugs 71, centrally apertured for the valve-stem 66, and containing the spring-pressed valve 69, adapted to be opened by the engagement of its terminal disk with the cams 54 and 55 as described; the said receptacle being also provided with an operating-lever 52, having upon its outer end a crank-handle 26, provided with a spring-pressed bolt 57 for the purpose specified, and having upon its inner end the cam 54 adapted to open the valves of the valve-chambers 63 and 65, and the cam 55, adapted to open the valve of the chamber 64, and the cam 53 adapted to open by engaging the guide 75 on the valve 80, the said receptacle having a connection with the atmosphere by means of the pipes 83 and 19, all substantially as described.

Signed by me, at Fort Wayne, Indiana, this 3d day of September, A. D. 1895.

AUGUSTUS BOWSER.

Witnesses:
LOUIS H. GOCKE,
KATE B. CHAPIN.